United States Patent
Balasubramanian (10) Patent No.: US 9,268,675 B2
(45) Date of Patent: Feb. 23, 2016

(54) COMPUTERIZED SYSTEM AND METHOD FOR AUDITING SOFTWARE CODE

(71) Applicant: Syntel, Inc., Troy, MI (US)

(72) Inventor: Padmanabhan Balasubramanian, Chennai (IN)

(73) Assignee: Syntel, Inc., Troy, MI (US)

( * ) Notice: Subject to any disclaimer, the term of this patent is extended or adjusted under 35 U.S.C. 154(b) by 0 days.

(21) Appl. No.: 14/093,602

(22) Filed: Dec. 2, 2013

(65) Prior Publication Data

US 2015/0154098 A1    Jun. 4, 2015

(51) Int. Cl.
*G06F 9/44* (2006.01)
*G06F 11/36* (2006.01)
*G06F 9/445* (2006.01)

(52) U.S. Cl.
CPC ........ *G06F 11/3692* (2013.01); *G06F 11/3604* (2013.01); *G06F 9/44589* (2013.01)

(58) Field of Classification Search
CPC .......... G06F 9/44589; G06F 11/3668–11/3692
USPC .................................................. 717/101–178
See application file for complete search history.

(56) References Cited

U.S. PATENT DOCUMENTS

| | | | |
|---|---|---|---|
| 5,754,760 A | 5/1998 | Warfield | |
| 6,671,874 B1 * | 12/2003 | Passova | G06F 8/73 714/E11.218 |
| 6,907,546 B1 * | 6/2005 | Haswell et al. | 714/38.11 |
| 7,000,221 B2 | 2/2006 | Bhogal et al. | |
| 7,003,765 B1 * | 2/2006 | Venkatasubramanian et al. | 717/143 |
| 7,222,265 B1 * | 5/2007 | LeSuer | G06F 11/3414 714/38.1 |
| 7,490,319 B2 * | 2/2009 | Blackwell | G06F 11/3664 717/124 |
| 7,934,201 B2 * | 4/2011 | Sweis | G06F 8/74 717/124 |
| 8,151,276 B2 * | 4/2012 | Grechanik et al. | 719/316 |
| 8,225,298 B2 * | 7/2012 | Seiffert | 717/143 |
| 8,239,820 B1 * | 8/2012 | White et al. | 717/101 |
| 8,365,147 B2 * | 1/2013 | Grechanik et al. | 717/124 |
| 8,572,570 B2 * | 10/2013 | Grechanik | G06F 11/3604 717/124 |
| 8,578,353 B2 * | 11/2013 | Seiffert | 717/143 |
| 8,756,049 B2 * | 6/2014 | Proctor | G06N 5/025 703/22 |
| 8,856,743 B2 * | 10/2014 | Sweis | G06F 8/74 714/38.1 |
| 8,881,109 B1 * | 11/2014 | Bridges, Sr. | G06F 11/263 714/38.1 |
| 9,141,519 B2 * | 9/2015 | Subramanian | G06F 11/3676 |
| 2003/0014734 A1 * | 1/2003 | Hartman | G06F 11/3684 717/125 |
| 2004/0153830 A1 * | 8/2004 | Cebula et al. | 714/38 |

(Continued)

OTHER PUBLICATIONS

Distributed Environment Integrating Tools for Software Testing—Anna Derezińska, Krzysztof Sarba—Institute of Computer Science, Warsaw University of Technology—Advanced Techniques in Computing Sciences and Software Engineering DOI 10.1007/978-90-481-3660-5_93, © Springer Science+Business Media B.V. 2010.*

(Continued)

*Primary Examiner* — Lewis A Bullock, Jr.
*Assistant Examiner* — Francisco Aponte
(74) *Attorney, Agent, or Firm* — Dykema Gossett PLLC (57) ABSTRACT

A system, method, and computer program product for auditing script code is disclosed. The system may include a parser module on a computer, a rules module on a computer, and a reporting module on a computer. The parser module may be configured to parse the script code to generate script code metadata. The rules module may be configured to audit the script code by applying rules to the script code. The reporting module on a computer configured to use the script code metadata to generate a result of the audit.

14 Claims, 9 Drawing Sheets

(56) References Cited

U.S. PATENT DOCUMENTS

| | | | |
|---|---|---|---|
| 2004/0181677 A1 | 9/2004 | Hong et al. | |
| 2005/0125780 A1* | 6/2005 | Rose et al. | 717/140 |
| 2005/0166094 A1* | 7/2005 | Blackwell | G06F 11/3664 |
| | | | 714/38.14 |
| 2006/0123389 A1* | 6/2006 | Kolawa et al. | 717/101 |
| 2006/0271830 A1* | 11/2006 | Kwong et al. | 714/50 |
| 2007/0083813 A1* | 4/2007 | Lui et al. | 715/709 |
| 2008/0092119 A1* | 4/2008 | Sweis | G06F 8/74 |
| | | | 717/124 |
| 2009/0217100 A1* | 8/2009 | Grechanik et al. | 714/38 |
| 2010/0088679 A1* | 4/2010 | Langworthy et al. | 717/126 |
| 2011/0173591 A1* | 7/2011 | Prasad | G06F 8/10 |
| | | | 717/126 |
| 2011/0307864 A1* | 12/2011 | Grechanik et al. | 717/124 |
| 2012/0131556 A1* | 5/2012 | Mathur et al. | 717/125 |
| 2012/0233599 A1* | 9/2012 | Valdiviezo Basauri et al. | 717/126 |
| 2013/0007522 A1* | 1/2013 | Kurapati et al. | 714/32 |
| 2013/0152047 A1* | 6/2013 | Moorthi et al. | 717/124 |
| 2013/0212553 A1* | 8/2013 | Balasubramanian | 717/102 |

OTHER PUBLICATIONS

Review: SSW Code Audtior by Tatham Oddie, tathan@oddie.com.au (Apr. 8, 2006, 3 pgs.).
SSW User Guide; Code Auditor (Jul. 4, 2004, 5 pgs.).
SSW Code Auditor—Screenshots (Pro Version) (Oct. 8, 2011, 12 pgs.).

* cited by examiner

| Sl No | Review Points |
|---|---|
| 1 | Verify whether the Script/Action/Library/Function Headers are available as per the THD standard |
| 2 | Parameters (Prefix Check - 'str' for String) |
| 3 | Variables (Prefix Check - at Dim statement) |
| 4 | Functions (Existence Check - function name) |
| 5 | Common Libraries (Function name prefix check - 'Func') |
| 6 | Verify that Option Explicit statement is present in the script |
| 7 | Verify whether all variables used are declared below the Option Explicit statement ← 701 |
| 8 | Verify whether function declarations and description is correctly available |
| 9 | Verify whether the open record sets and files are closed |
| 10 | Check whether proper step no and proper test steps are given |
| 11 | Check whether Wait statements with hard coded values are not used unnecessarily |
| 12 | Check whether loops are implemented correctly(infinite loops) ← 703 |
| 13 | Verify whether required Object repository file is associated |
| 14 | Verify whether required Library files are associated |

COMPUTERIZED SYSTEM AND METHOD FOR AUDITING SOFTWARE CODE

TECHNICAL FIELD

This disclosure relates generally to computerized systems, and, in particular, this disclosure relates to a computerized system that is programmed to audit script code to determine various metrics.

BACKGROUND

Source code may be described as computer instructions written in a human-readable format. The instructions are written in a computer programming language that can be executed by a processor after being compiled or interpreted into machine-readable instructions, which is often called object code. Script code may be defined as computer programs written for runtime environments that can interpret and automate the execution of tasks which could alternatively be executed one-by-one by a human operator. Examples of environments that may be automated through script code include software applications, web pages within a web browser, the shells of operating systems ("OS"), and several general purpose and domain-specific languages, such as those for embedded systems.

There are circumstances in which analysis, or an audit, of the script code is desired, including, for example, to assess different metrics and for code standard compliance. However, this analysis may be difficult to perform, particularly for large volumes of script code. Therefore, there is a need for a computerized tool that audits script code in a more efficient manner. The script code in this context is referring to QTP Scripts & Loadrunner Scripts and the approach can be applied for any similar needs.

SUMMARY

According to one aspect, the disclosure provides systems, methods, and computer program products for auditing script code. Embodiments may include a parser module on a computer, a rules module on a computer, and a reporting module on a computer. The parser module may be configured to parse the script code to generate script code metadata. The rules module may be configured to audit the script code by applying rules to the script code. The reporting module on a computer configured to use the script code metadata to generate a result of the audit.

Additional features and advantages of the will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIG. 4 is an example screenshot of a home page of the system according to one embodiment of the disclosure;

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Embodiments of the disclosure are directed to a computerized system programmed with an auditing tool that is configured to audit script code for one or more programs, at least in order to gather certain metrics and ensure compliance of any coding standards. For example, coding standards can take the form of review points in a sheet of rules which are to be applied to script code to be audited. The script code is a code file in a script programming language such as Visual Basic Scripting Edition, a scripting language developed by Microsoft™ Corporation for Quick Test Professional (QTP) offered by Mercury Interactive™ of Mountain View, Calif. and Loadrunner scripts a scripting language for HP-Loadrunner tool.

Figure 1:
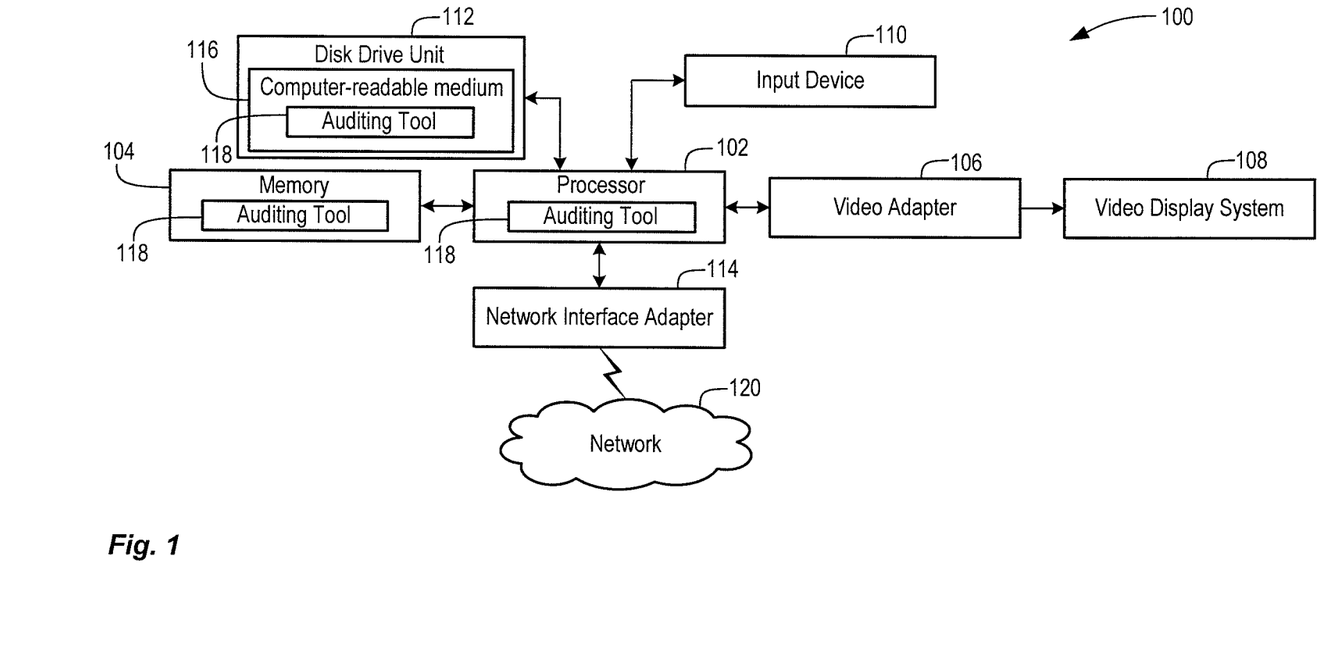
FIG. 1 is a digrammatical view of an example computing device that may be included in the system and that may be programmed to carry out various methods taught herein according to one embodiment of the disclosure.

FIG. 1 illustrates a diagrammatic representation of a machine 100, in the example form of a computer system, that may be programmed with a set of instructions to perform any one or more of the methods discussed herein. The machine may be a personal computer, a notebook computer, a server, a tablet computer, a personal digital assistant ("PDA"), a cellular telephone, or any machine capable of executing a set of instructions (sequential or otherwise) that specify actions to be taken by that machine.

The machine 100 may operate as a standalone device or may be connected (e.g., networked) to other machines. In embodiments where the machine is a standalone device, the set of instructions could be a computer program stored locally on the device that, when executed, causes the device to perform one or more of the methods discussed herein. Consider an example in which the machine 100 is a tablet device, such as an iPad™ or Android™ device; the computer program could be an "app" installed on the tablet device. In embodiments where the computer program is locally stored, data may be retrieved from local storage or from a remote location via a network. For example, historical data regarding various financial products could be stored locally on the machine or could be accessed remotely if a network connection is available. In a networked deployment, the machine 100 may operate in the capacity of a server or a client machine in server-client network environment, or as a peer machine in a peer-to-peer (or distributed) network environment. Although only a single machine is illustrated in FIG. 1, the term "machine" shall also be taken to include any collection of machines that individually or jointly execute a set (or multiple sets) of instructions to perform any one or more of the methods discussed herein.

The example machine 100 illustrated in FIG. 1 includes a processor 102 (e.g., a central processing unit ("CPU")), a memory 104, a video adapter 106 that drives a video display system 108 (e.g., a liquid crystal display ("LCD") or a cathode ray tube ("CRT")), an input device 110 (e.g., a keyboard, mouse, touch screen display, etc.) for the user to interact with the program, a disk drive unit 112, and a network interface adapter 114. Note that various embodiments of the machine 100 will not always include all of these peripheral devices.

The disk drive unit 112 includes a computer-readable medium 116 on which is stored one or more sets of computer instructions and data structures embodying or utilized by an auditing tool 118 described herein. The computer instructions and data structures may also reside, completely or at least partially, within the memory 104 and/or within the processor 102 during execution thereof by the machine 100; accordingly, the memory 104 and the processor 102 also constitute computer-readable media. Embodiments are contemplated in which the auditing tool 118 may be transmitted or received over a network 120 via the network interface device 114 utilizing any one of a number of transfer protocols including but not limited to the hypertext transfer protocol ("HTTP") and file transfer protocol ("FTP").

The network 120 may be any type of communication scheme including but not limited to fiber optic, cellular, wired, and/or wireless communication capability in any of a plurality of protocols, such as TCP/IP, Ethernet, WAP, IEEE 802.11, or any other protocol.

While the computer-readable medium 116 shown in the example embodiment of FIG. 1 is a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Figure 2:
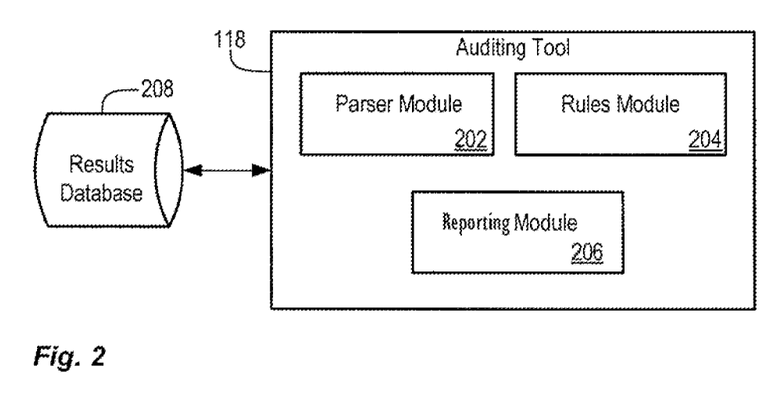
FIG. 2 is a high level digrammatical view of the system according to one embodiment of the disclosure.

FIG. 2 is an example system architecture that may be used for the auditing tool 100. In the example shown, the auditing tool 118 includes a parser module 202, a rules module 204, a reporting module 206, and a results database 208. For the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

According to embodiments of the disclosure, the parser module 202 may read the input script code file, such as that received from a user, which may include script code for a plurality of programs. The parser 202 module may break down the script code into code components for analysis. For example, the parser module 202 may process the script code based on the syntax rules of the language, and identify various components of the language, such as any variable declarations, classes, modules, methods, constructs, and statements. The parser module 202 may use various other components to compute metrics, resolve references and generate metadata for the input script code.

According to embodiments of the disclosure, the rules module 204 may provide a set of rules for auditing the script code to generate audit information. For example, the rules module 204 may include a plurality of different rules for different types of audits to be performed on the script code. In some embodiments, these rules may take the form of a checklist of review points against which the script code audit may be done. For example, the review points may represent aspects of coding standards to ensure the script code is of a satisfactory quality. The rules may be provided in a spreadsheet, such as Microsoft Excel™ offered by Microsoft Corporation of Redmond, Wash. In this manner, a user can select the type of audit that is desired, for example, by supplying various rules sheets including any desired number of review points.

According to embodiments of the disclosure, the reporting module 206 may use the metadata and audit information to generate reports desired by the user. These metadata and audit information, which may be stored in a results database 208, may be used by the reporting module 206 to generate a report displaying the results of the audit.

Figure 3:
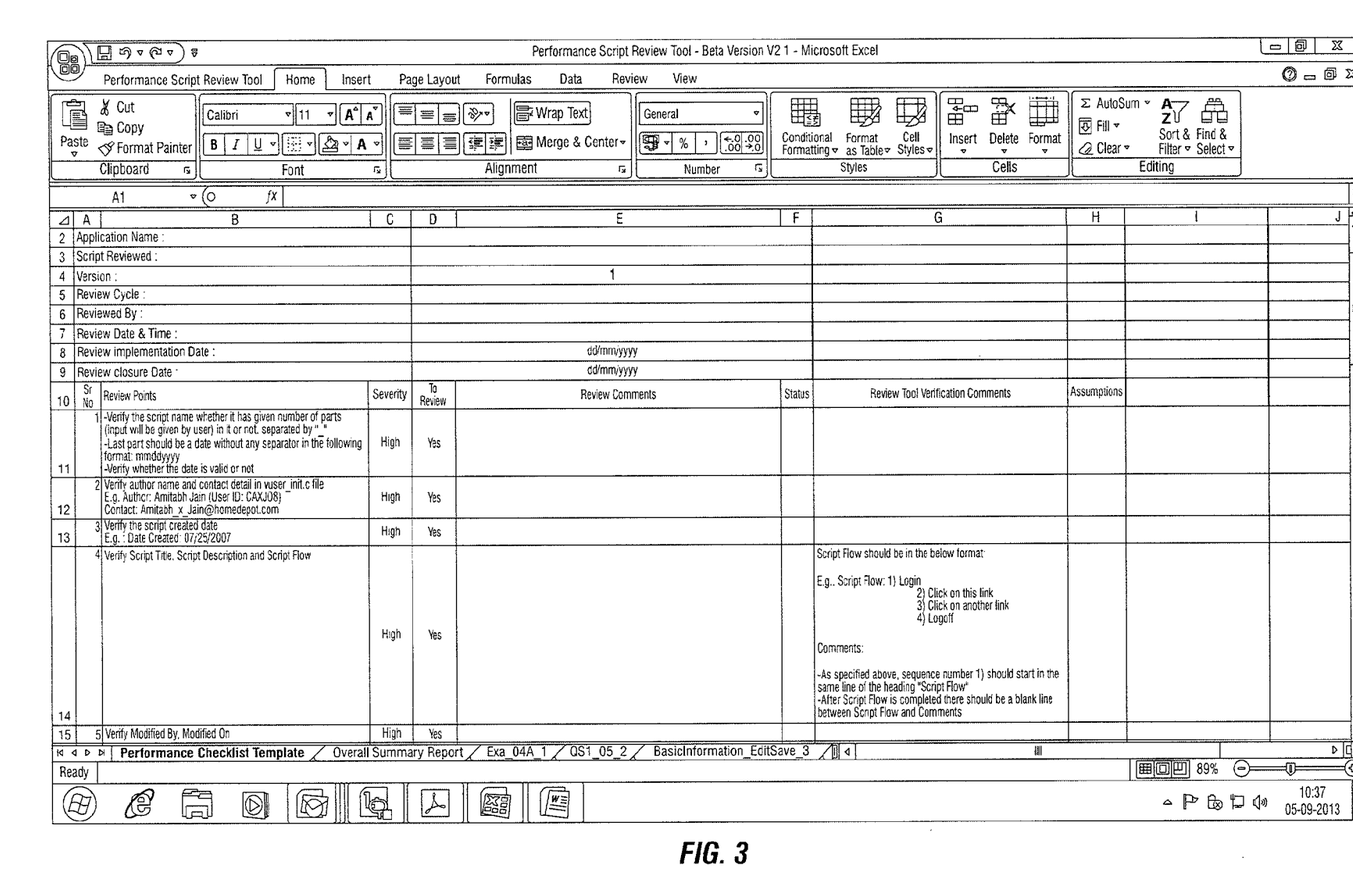
FIG. 3 is an example screenshot of an initiation page of the system according to one embodiment of the disclosure.

Upon installation, a user may be presented with an interface, an example of which is shown in FIG. 3, displaying an initiation page of the auditing tool. Following initiation, a home page may be displayed, an example screenshot of which is shown in FIG. 4. As shown in FIG. 4, the home page may display a performance checklist template displaying information related to a script code audit.

Figure 5:
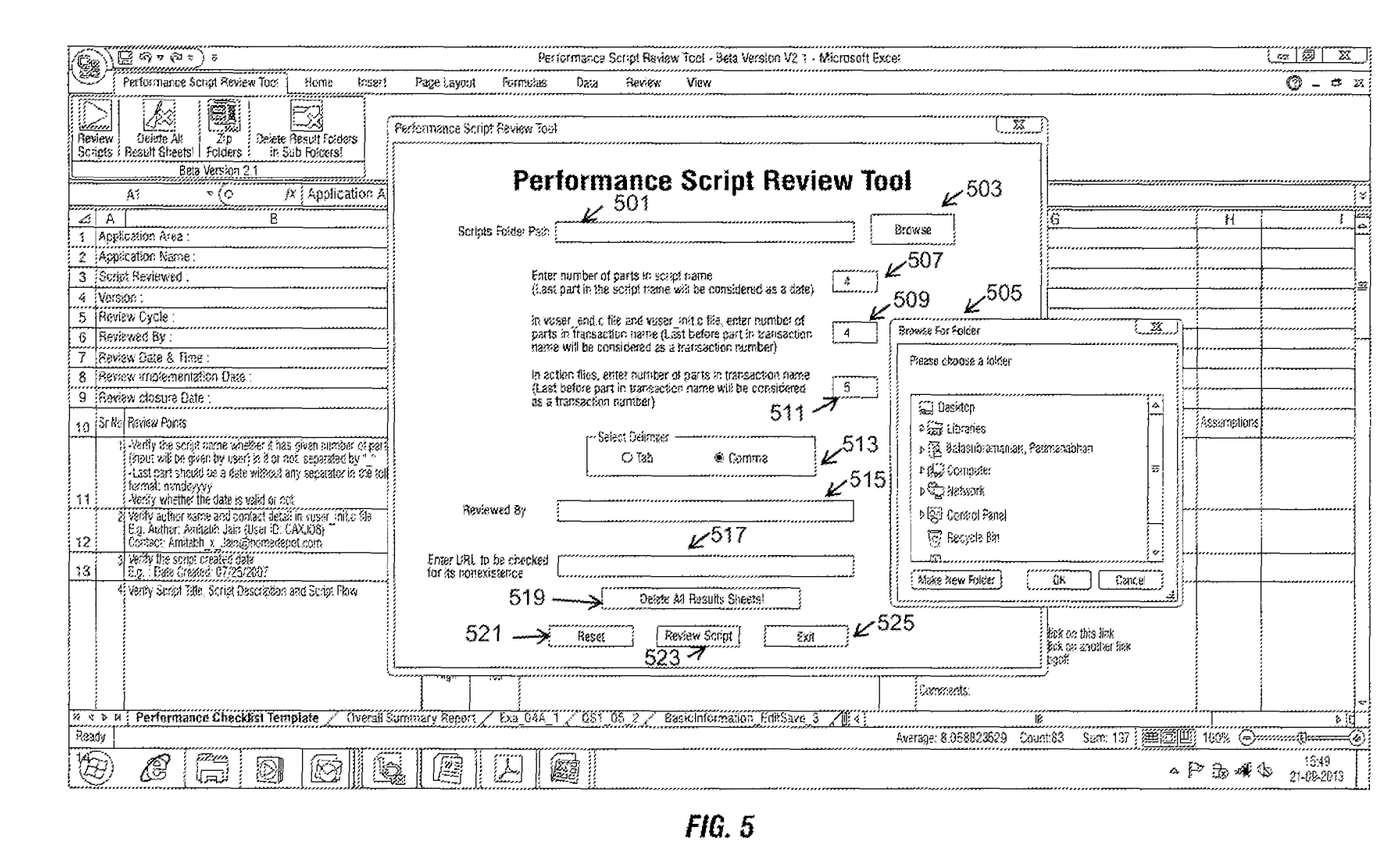
FIG. 5 is an example screenshot of a script selection page of the system according to one embodiment of the disclosure.

FIG. 5 is an example screenshot of a script selection page of the auditing tool. As shown, a user may enter a path to locate a script to be auditing in field 501. The user may also click the browse button 503 to browse for the script by use of, for example, a folder explorer window 505.

Embodiments of the disclosure also allow the user to enter details about the script code he or she wishes to have audited. For example, the user may enter a number of parts of a script name 507, a number of parts 509 in a transaction name of the end and initiation files, and a number of parts 511 in a transaction name of the action files. The user may enter a delimiter type 513, the entity 515 reviewing the script code, and the uniform resource location (URL) 517 to be checked for the script code's nonexistence. The user may also delete all previous results by clicking the "Delete All Results Sheets" button 519. Further, the user may reset the tool, review any entered script (such as in field 501), or exit the tool, through clicking respective buttons, 521, 523, or 525.

Figure 6:
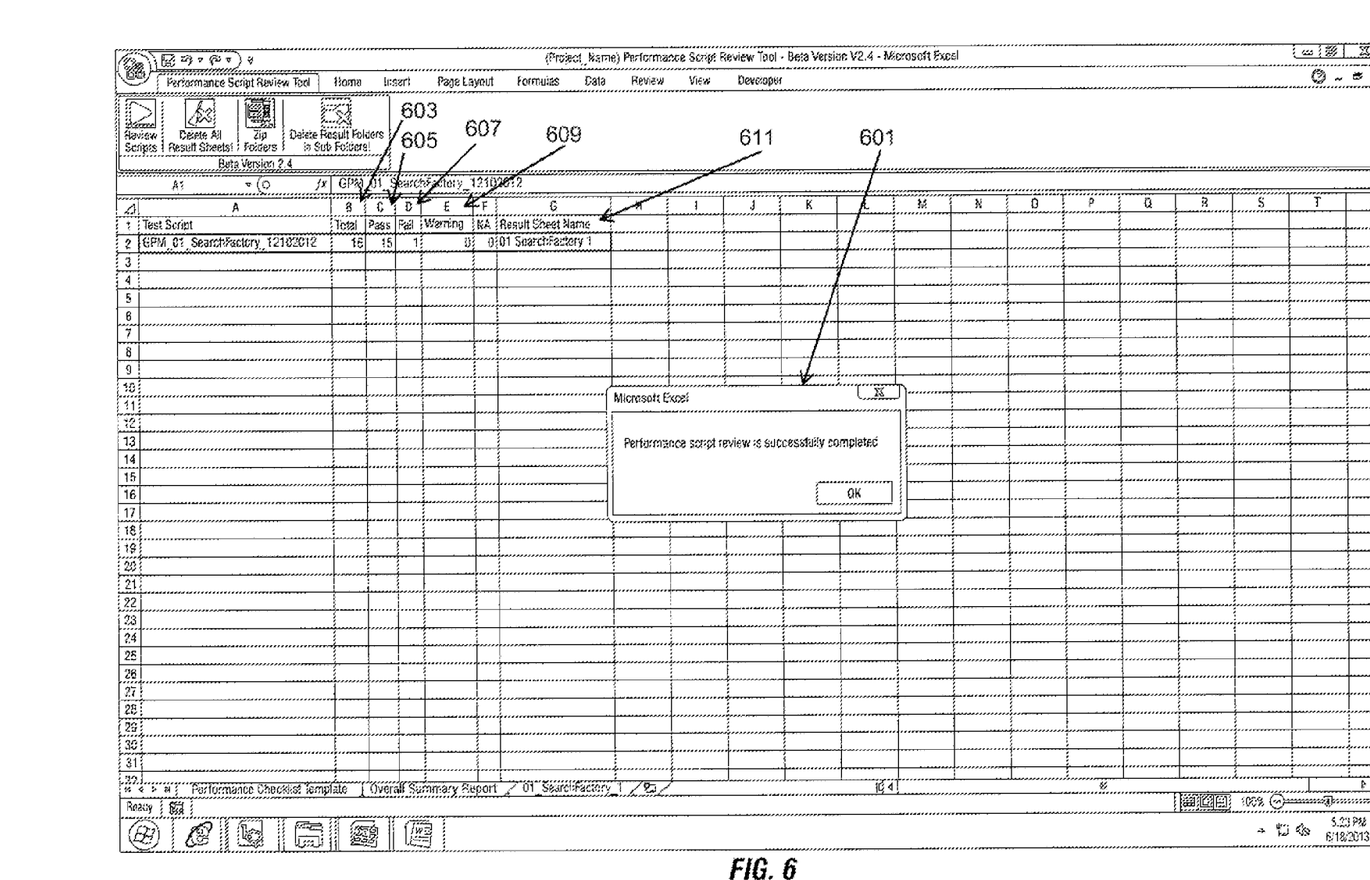
FIG. 6 is an example screenshot of an execution page of the system according to one embodiment of the disclosure.

Upon review of the script code, such as through clicking button 523 of the script code selection page, the user may be presented with an execution page as shown in the example screenshot of FIG. 6. As shown, a pop-up window 601 may alert the user that the audit has been successfully completed. The execution page may show details including a total number of points reviewed 603, a number of review points passing the audit 605 (e.g., meeting a coding standard reflected by the review point), a number of review points failing the audit 607 (e.g., failing to meet a coding standard reflected by the review point), any warnings 609, and a location (or name) 611 of a results sheet showing more details of the audit.

Figure 7:
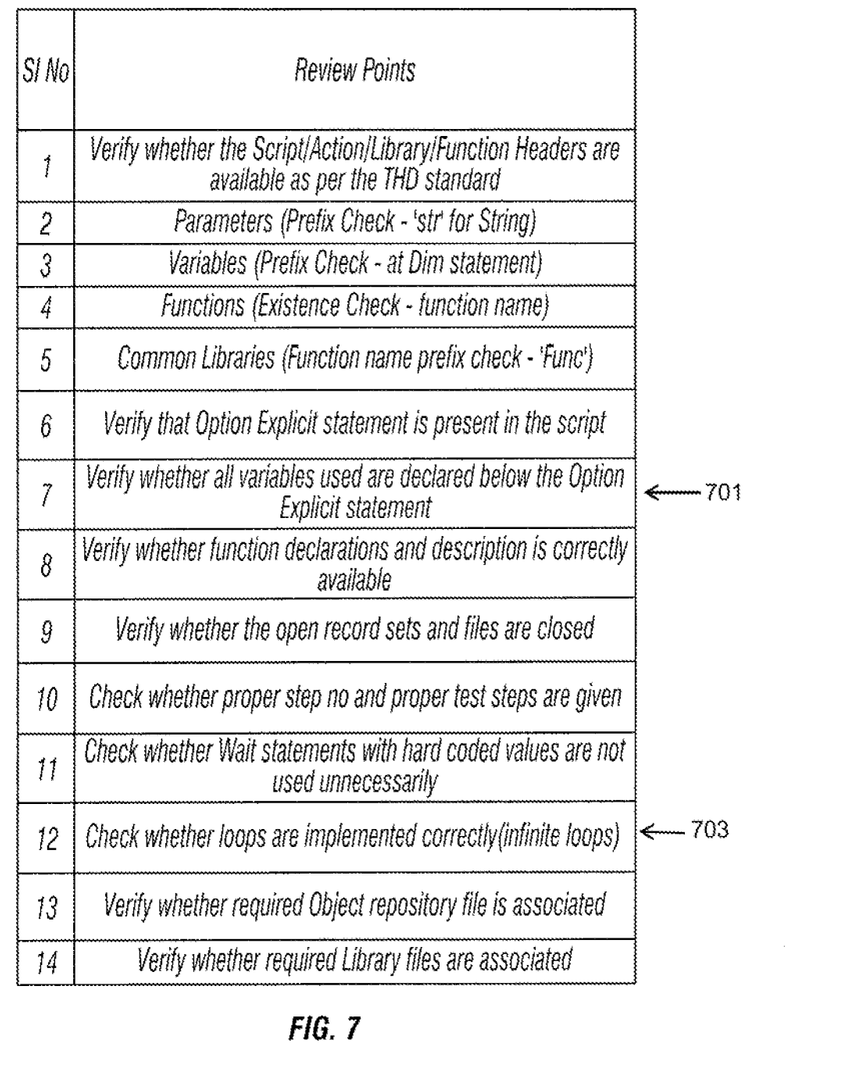
FIG. 7 is an example screenshot of a checklist including specific review points to be applied in an audit according to one embodiment of the disclosure.

As discussed above, embodiments of the disclosure include a rules module that may include a plurality of different rules and review points for different types of analysis to be performed on the script code. In some embodiments, these rules may take the form of a checklist against which the script code audit may be done. FIG. 7 is an example checklist including specific review points to be applied in the audit. For example, the tool may review, such as at review point number 7, whether all variables in the script code are declared below the option explicit statement 701. As another example, the tool may review whether loops in the script code are properly implemented 703. It should be noted that the above examples of review points are not exhaustive. One skilled in the art should appreciate that the tool can implement any number and type of review points. Further, one skilled in the art should appreciate that these review points can be changed at any time, such as, to reflect any changes in coding standards.

Figure 8:
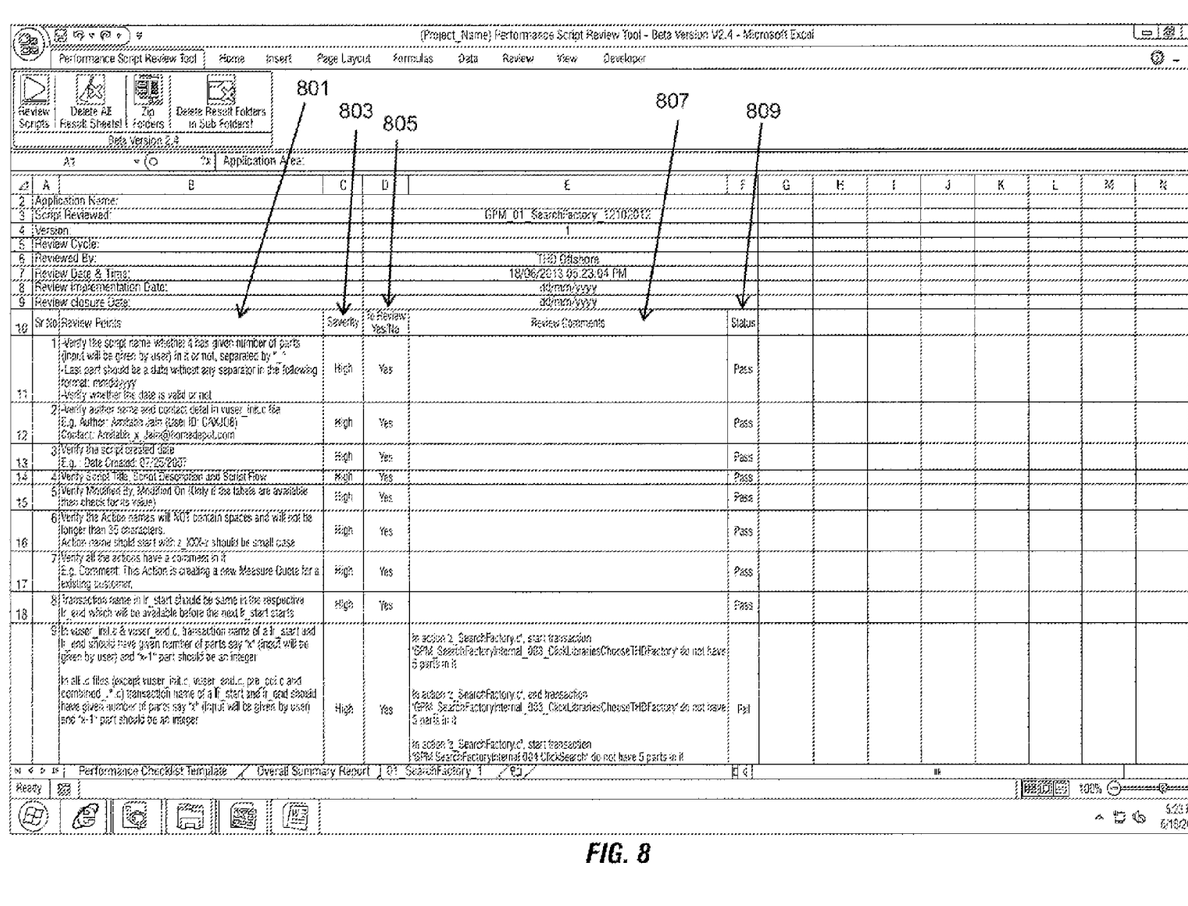
FIG. 8 is an example screenshot of a results sheet displaying results of an audit according to one embodiment of the disclosure.

FIG. 8 is an example screenshot of a results sheet showing details of an audit. This results sheet may display detailed results of an audit. For example, the results sheet may include script code review points 801, a respective severity level of each review point 803, a review field 805 to check whether or not a review point is to be applied, a review comments field 807, and a compliance status field 809. The review comments field 807 may contain various comments concerning the respective review point. For example, this field 807 may contain more details about how the particular review point was applied to the script code, identification of a location of specific lines of the script code pertinent to the respective review point, and a location of lines meeting (e.g., complying), or failing (e.g., failing to comply) to meet a code standard represented by the respective review point. It should be noted that the above examples of review comments and field types are not exhaustive. One skilled in the art should appreciate that the tool can implement any type of comment and field type.

Figure 9:
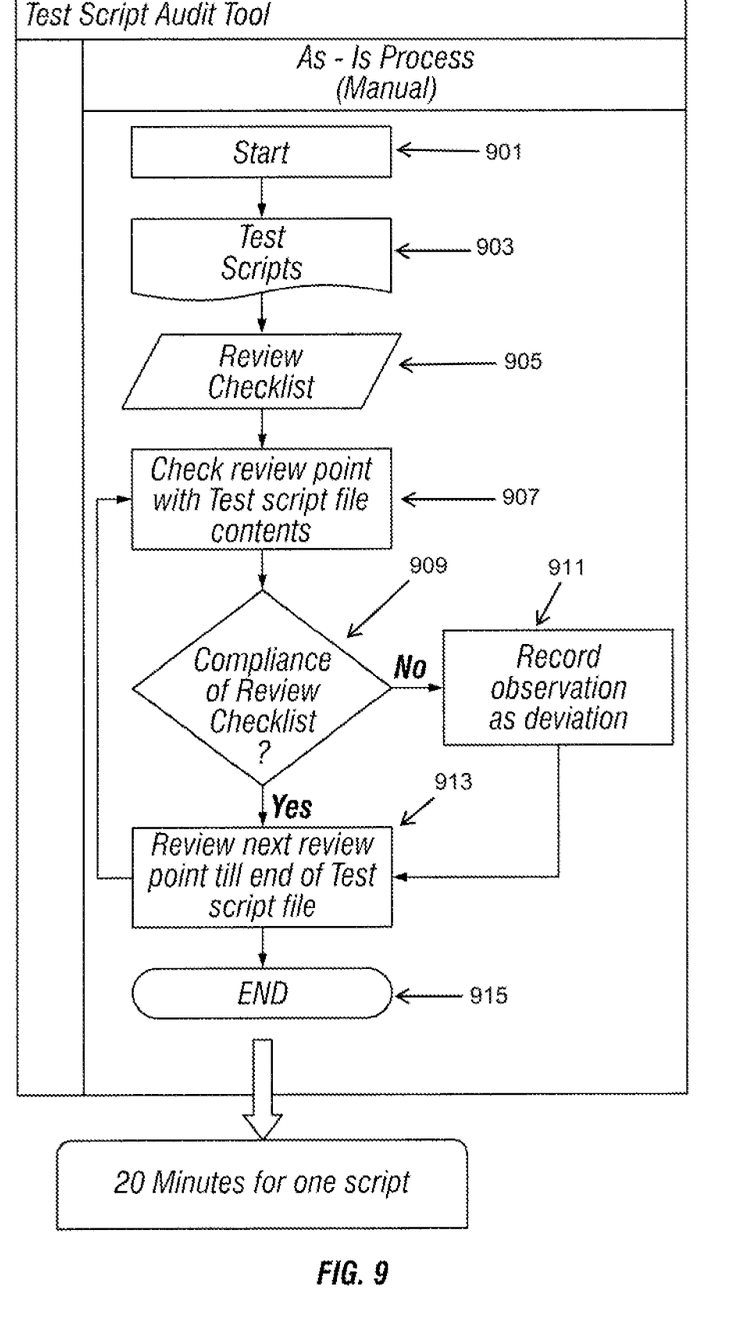
FIG. 9 is a flow chart describing operation of the auditing tool according to one embodiment of the disclosure.

In accordance with the foregoing, and as shown in the flowchart of FIG. 9, upon initiation of the auditing tool at block 901, a user may enter script code 903 to be audited. The user may also enter a review checklist 905. At 907, the tool may check a review point from the review checklist 905, against the entered script code 903. Based on the result of the check, at 909, the tool may decide whether an aspect of the script code complies with a review point. If a portion (e.g., line) of the script code fails to comply with the review point, the failed aspect is recorded as a deviation at 911, and then the tool proceeds to the next review point at 913. If the portion of the script code complies with the review point, the tool proceeds to the next review point on the checklist at 913 until the entire script code file has been audited, at which point the audit is complete at 915.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computerized system for auditing a script code, the system comprising:
   a parser module stored on a computer and configured to parse the script code to generate script code metadata when the parser module is executed by the computer;
   a rules module stored on the computer and configured to audit the script code by applying rules to the script code when the rules module is executed by the computer; and
   a reporting module stored on the computer and configured to use the script code metadata to generate a result of the audit when the reporting module is executed by the computer;
   wherein the parser module is configured to read the script code from an input script code file, the script code comprising at least one of a Quick Test Professional (QTP) script and a Load-runner script;
   wherein the rules include a plurality of review points, the result includes a respective severity level associated with each of the plurality of review points, and applying the rules to the script code includes
      checking a first review point of the plurality of review points against the script code;
      recording a deviation if the script code does not comply with the first review point; and
      checking a remainder of the review points of the plurality of review points against the script code and recording deviations for each review point that the script code does not comply with;
   wherein each of the plurality of review points is associated with a portion of the script code to be audited; and
   wherein the result includes a respective (i) review field, (ii) review comment field, and (iii) status field associated with each of the plurality of review points.

2. The computerized system of claim 1, wherein the parser module includes an interface to allow selection of one or more portions of the script code; and wherein the rules module is further configured to only apply the rules to the selected one or more portions of the script code.

3. The computerized system of claim 1, wherein the result includes an indication of compliance of the audited portion with the each of the plurality of review points and an identification of a location of a portion of the script code failing to comply with a coding standard.

4. The computerized system of claim 1, wherein the audit includes identification of a location of a portion of the script code failing to comply with a coding standard.

5. The computerized system of claim 1, wherein the audit includes identification of a location of a portion of the script code complying with a coding standard.

6. A computerized system for auditing a script code, the system comprising:
   one or more computing devices including:
      a memory having program code stored therein;
      a processor in communication with the memory for carrying out instructions in accordance with the stored program code, wherein the program code, when executed by the processor, causes the processor to perform operations comprising:

analyzing the script code to generate script code metadata;

auditing the script code by applying rules to the script code; and using the script code metadata to generate a result of the audit;

wherein the script code comprises at least one of a Quick Test Professional (QTP) script and a Load-runner script;

wherein the rules include a plurality of review points, the result includes a respective severity level associated with each of the plurality of review points, and applying the rules to the script code includes checking a first review point of the plurality of review points against the script code;

recording a deviation if the script code does not comply with the first review point; and checking a remainder of the review points of the plurality of review points against the script code and recording deviations for each review point that the script code does not comply with wherein each of the plurality of review points is associated with a portion of the script code to be audited; and wherein the result includes a respective (i) review field, (ii) review comment field, and (iii) status field associated with each of the plurality of review points.

7. The computerized system of claim 6, further comprising allowing selection of one or more portions of the script code; and applying the rules only to the selected one or more portions of the script code.

8. The computerized system of claim 6, wherein the result includes an indication of compliance of the audited portion with the each of the plurality of review points.

9. The computerized system of claim 6, wherein the deviation includes a location of a portion of the script code failing to comply with a coding standard.

10. The computerized system of claim 6, wherein the audit includes identification of a location of a portion of the script code complying with a coding standard.

11. A computerized system for auditing a script code, the system comprising:

a parser module stored on a computer and, when executed by the computer, configured to:

parse the script code to generate script code metadata; and allow selection of one or more portions of the script code;

a rules module stored on the computer and configured to audit the script code by applying rules to the selected one or more portions of the script code when the rules module is executed by the computer; and a reporting module stored on the computer and configured to use the script code metadata to generate a result of the audit when the reporting module is executed by the computer;

wherein the parser module is configured to read the script code from an input script code file, the script code comprising at least one of a Quick Test Professional (QTP) script and a Load-runner script wherein the rules include a plurality of review points, the result includes a respective severity level associated with each of the plurality of review points, and applying the rules to the selected one or more portions of the script code includes checking a first review point of the plurality of review points against the selected one or more portions of the script code;

recording a deviation if the selected one or more portions of the script code do not comply with the first review point; and checking a remainder of the review points of the plurality of review points against the selected one or more portions of the script code and recording deviations for each review point that the selected one or more portions of the script code does not comply with;

wherein each of the plurality of review points is associated with a portion of the selected one or more portions of the script code to be audited; and wherein the result includes a respective (i) review field, (ii) review comment field, and (iii) status field associated with each of the plurality of review points.

12. The computerized system of claim 11, wherein the result includes an indication of compliance of the audited portion with the each of the plurality of review points.

13. The computerized system of claim 11, wherein the audit includes identification of a location of a portion of the script code failing to comply with a coding standard.

14. The computerized system of claim 11, wherein the audit includes identification of a location a portion of the script code complying with a coding standard.

* * * * *